United States Patent
Ikeda

(10) Patent No.: US 10,250,625 B2
(45) Date of Patent: Apr. 2, 2019

(54) INFORMATION PROCESSING DEVICE, COMMUNICATION HISTORY ANALYSIS METHOD, AND MEDIUM

(71) Applicant: NEC Corporation, Tokyo (JP)

(72) Inventor: Satoshi Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 15/312,041

(22) PCT Filed: May 18, 2015

(86) PCT No.: PCT/JP2015/002476
§ 371 (c)(1),
(2) Date: Nov. 17, 2016

(87) PCT Pub. No.: WO2015/178002
PCT Pub. Date: Nov. 26, 2015

(65) Prior Publication Data
US 2017/0085586 A1    Mar. 23, 2017

(30) Foreign Application Priority Data

May 22, 2014   (JP) ................................ 2014-106226

(51) Int. Cl.
*H04L 29/06*    (2006.01)
*G06F 13/00*    (2006.01)
*G06F 21/55*    (2013.01)

(52) U.S. Cl.
CPC .......... *H04L 63/1425* (2013.01); *G06F 13/00* (2013.01); *G06F 21/55* (2013.01); *H04L 63/145* (2013.01); *H04L 63/1491* (2013.01)

(58) Field of Classification Search
CPC .................................................. H04L 63/1425
See application file for complete search history.

(56) References Cited

U.S. PATENT DOCUMENTS

| 2002/0059212 A1* | 5/2002 | Takagi ..................... G06F 9/548 |
| 2012/0143650 A1 | 6/2012 | Crowley et al. |
| 2016/0127409 A1* | 5/2016 | Wurth ..................... G06F 21/577 |
| | | 726/25 |

FOREIGN PATENT DOCUMENTS

| JP | 11-306067 A | 11/1999 |
| JP | 2003-280945 A | 10/2003 |

(Continued)

OTHER PUBLICATIONS

International Search Report corresponding to PCT/JP2015/002476, dated Jul. 28, 2015 (5 pages).

(Continued)

*Primary Examiner* — Simon P Kanaan
(74) *Attorney, Agent, or Firm* — Wilmer Cutler Pickering Hale and Dorr LLP

(57) ABSTRACT

An information processing device of the present invention includes: a degree-of-possibility calculation unit that calculates, based on a history of communication between a client and a server, the history including at least an identifier of the server, an identifier of the client, and a user agent character string included in a request header sent from the client, a degree of possibility that indicates a degree of certainty of a practical user agent permitted to operate as a portion of the client, with respect to each user agent that relates to the user agent character string; and a disguise information notification unit that outputs, based on the basis of the degree of possibility, disguise information that is information regarding communication performed by a fake user agent impersonating the practical user agent.

9 Claims, 10 Drawing Sheets

(56) References Cited

FOREIGN PATENT DOCUMENTS

JP          2011-233081  A          11/2011
JP          2013-192019  A           9/2013

OTHER PUBLICATIONS

Written Opinion corresponding to PCT/JP2015/002476, dated Jul. 28, 2015 (7 pages).
"Design and Management Guide for Countermeasures Against New Type Attacks," the revised second edition, Independent-Administrative-Corporation, Information-technology Promotion Agency, Japan, Security Center [online], Nov. 2011, [retrieval date Jul. 15, 2015], Internet <URL:https://www.ipa.go.jp/files/000017308.pdf> (62 pages).

* cited by examiner

| CLIENT IDENTIFIER | USER AGENT CHARACTER STRING | NUMBER OF DOMAINS | DEGREE OF POSSIBILITY |
|---|---|---|---|
| 192.168.1.1 | Mozilla/4.0 (XXX) | 20 | 1.00 |
| 192.168.1.1 | Mozilla/4.0 (YYY) | 2 | 0.00 |
| 192.168.1.2 | Mozilla/5.0 (ZZZ) | 32 | 1.00 |
| 192.168.1.2 | Mozilla/4.0 (XXX) | 1 | 0.00 |
| 192.168.1.3 | Mozilla/4.0 (YYY) | 15 | 1.00 |

Fig. 7

| SERVER IDENTIFIER 812 | ⟨CLIENT AND COMMUNICATION CONTROL MEANS⟩ 836 | DEGREE OF POSSIBILITY 825 | DEGREE OF DISGUISE 837 |
|---|---|---|---|
| malicous.example.com | ⟨192.168.1.1, Mozilla/4.0 (XXX)⟩ | 0.00 | 0.75 |
| | ⟨192.168.1.2, Mozilla/4.0 (XXX)⟩ | 0.00 | |
| | ⟨192.168.1.3, Mozilla/5.0 (YYY)⟩ | 1.00 | |
| | ⟨192.168.1.4, Mozilla/4.0 (XXX)⟩ | 0.00 | |

INFORMATION PROCESSING DEVICE, COMMUNICATION HISTORY ANALYSIS METHOD, AND MEDIUM

CROSS-REFERENCE TO RELATED APPLICATIONS

This application is a national stage application of International Application No. PCT/JP2015/002476 entitled "INFORMATION PROCESSING DEVICE, INFORMATION PROCESSING SYSTEM, AND COMMUNICATION HISTORY ANALYSIS METHOD" filed on May 18, 2015, which claims the benefit of the priority of Japanese Patent Application No. 2014-106226, filed on May 22, 2014, the disclosures of each of which are hereby incorporated by reference in their entirety.

TECHNICAL FIELD

The present invention relates to a technology that analyzes the history of communication in a network.

BACKGROUND ART

In enterprise networks, the cutoff and the monitoring of communication are carried out by a firewall, an IDS (Intrusion Detection System), or the like. A purpose for this is to prevent information leakage from enterprise networks, external attacks to appliances within enterprise networks, and the like.

On the other hand, sending and receiving electronic mails, browsing the World Wide Web, and the like are often indispensable in business and such communication is often permitted under certain restrictions. For example, there is a construction in which, with regard to access from a client to an external web server, only the access via a proxy server is permitted. Such a construction prevents the clients within an enterprise network from being exposed directly to an external network and makes unauthorized accesses to and intrusion acts to the clients difficult to perform.

However, as targeted attacks have become common, mere inlet countermeasures aimed at preventing unauthorized accesses and intrusion acts from the outside allow occurrences of situations where securement of security is difficult. The targeted attack herein is an attack in which, by skillfully utilizing contacts with an external network, such as mails, webs, and the like, a piece of malware, such as a RAT (Remote Access Tool, a remote management tool), is infiltrated into a terminal within an enterprise network.

Because targeted attacks are targeted at specific companies or groups, obtaining samples thereof is more difficult in comparison with obtaining ordinary viruses and pieces of adware. Therefore, it is highly likely that before security vendors update their definition files for malware, attacks will have already progressed. Thus, the attacks are difficult to be prevented by mere inlet countermeasures alone. For example, targeted attacks targeted at companies are often aimed at stealing classified information. In this case, outlet countermeasures for preventing leakage of classified information to the outside are important.

A technology that solves such a problem is described in PTL 1.

Generally, a terminal infected with malware, such as a RAT, limits processes on the terminal to be autonomously executed. Therefore, the infected terminal performs communication with a control server called C&C (Command and Control) server and, by receiving instruction from the C&C server, the infected terminal gathers information, and transmits and receives data. Therefore, if communication between the infected terminal and the C&C server can be detected as unauthorized communication, that leads to discovery of an incident and prevention of information leakage.

A malware communication detection system described in PTL 1 includes the following construction. Firstly, a proxy server, according to a request from a browser of a client to an external server, generates an authentication program and sends that authentication program to the client. Secondly, the browser of the client executes the received authentication program and sends results of the execution to the proxy server. Thirdly, based on the received results of the execution, the proxy server determines whether or not the request is a request from malware, that is, whether the access on that request is good or not.

The malware communication detection system of PTL 1 that includes the foregoing construction is capable of detecting communication performed by malware even in the case where the malware disguises itself as a browser.

CITATION LIST

Patent Literature

[PTL 1] Japanese Laid-open Patent Publication No. 2013-192019

SUMMARY OF INVENTION

Technical Problem

However, the technology described in the foregoing prior-art document has a problem in which environments that are possible to be applied the technology for analyzing communication history (an operation environment of a system to be used, a service environment, and the like) are rather limited.

A reason for this is that a browser for a malware communication detection system described in PTL 1 needs to be a special browser capable of executing the authentication program.

In other words, a proxy server in the malware communication detection system described in PTL 1 has a possibility of cutting off some of the communication, which is executed by a program other than the browsers compatible with the authentication program, to an external network. However, depending on the environment, there are cases where preventative measures against creating such an inconvenience cannot be taken.

It is demanded that, even in such environments, detection of communication performed by malware that disguises itself as a browser be made possible.

An object of the present invention is to provide an information processing device, an information processing system, and a communication history analysis method that are capable of solving the problem that environments in which the technology that analyzes communication history is applicable are rather limited and also a program therefor or a computer-readable non-transitory recording medium in which that program is recorded.

Solution to Problem

An information processing device according to one aspect of the present invention includes: a degree-of-possibility calculation unit the calculates, based on a history of communication between a client and a server, the history including at least an identifier of the server, an identifier of the client, and a user agent character string included in a request header sent from the client, a degree of possibility that indicates a degree of certainty of a practical user agent permitted to operate as a portion of the client, with respect to each user agent that relates to the user agent character string; and a disguise information notification unit that outputs, based on the basis of the degree of possibility, disguise information that is information regarding communication performed by a fake user agent impersonating the practical user agent.

An information processing system according to one aspect of the present invention includes: a proxy server that is connected to a network and that relays a request from client to a server; the client that is connected to the proxy server and that accesses, via the proxy server, the server connected to the network; a log storage unit that stores a history of communication generated by the proxy and including at least an identifier of the server, an identifier of the client, and a user agent character string included in a request header sent from the client; a degree-of-possibility calculation unit that calculates, based on the history of communication, a degree of possibility that indicates a degree of certainty of a practical user agent permitted to operate as a portion of the client, with respect to each user agent that relates to the user agent character string; and a disguise information notification unit that outputs, based on the basis of the degree of possibility, disguise information that is information regarding communication performed by a fake user agent impersonating the practical user agent.

A communication history analysis method according one aspect of the present invention includes: calculating, based on a history of communication between a client and a server, the history including at least an identifier of the server, an identifier of the client, and a user agent character string included in a request header sent from the client, a degree of possibility that indicates a degree of certainty of a practical user agent permitted to operate as a portion of the client, with respect to each user agent that relates to the user agent character string; and outputting, based on the basis of the degree of possibility, disguise information that is information regarding communication performed by a fake user agent impersonating the practical user agent.

A computer-readable non-transitory recording medium according one aspect of the present invention embodies a program. The program recorded in the medium causes a computer to perform a method. The method includes: calculating, based on a history of communication between a client and a server, the history including at least an identifier of the server, an identifier of the client, and a user agent character string included in a request header sent from the client, a degree of possibility that indicates a degree of certainty of a practical user agent permitted to operate as a portion of the client, with respect to each user agent that relates to the user agent character string; and outputting, based on the degree of possibility, disguise information that is information regarding communication performed by a fake user agent impersonating the practical user agent.

Advantageous Effects of Invention

The present invention has an advantageous effect that, regardless of the use environment, it becomes possible to obtain information regarding communication performed by malware that disguises itself as a user agent.

BRIEF DESCRIPTION OF DRAWINGS

FIG. 7 is a diagram showing an example of the degree of disguise in the first example embodiment.

DESCRIPTION OF EMBODIMENTS

Figure 1:
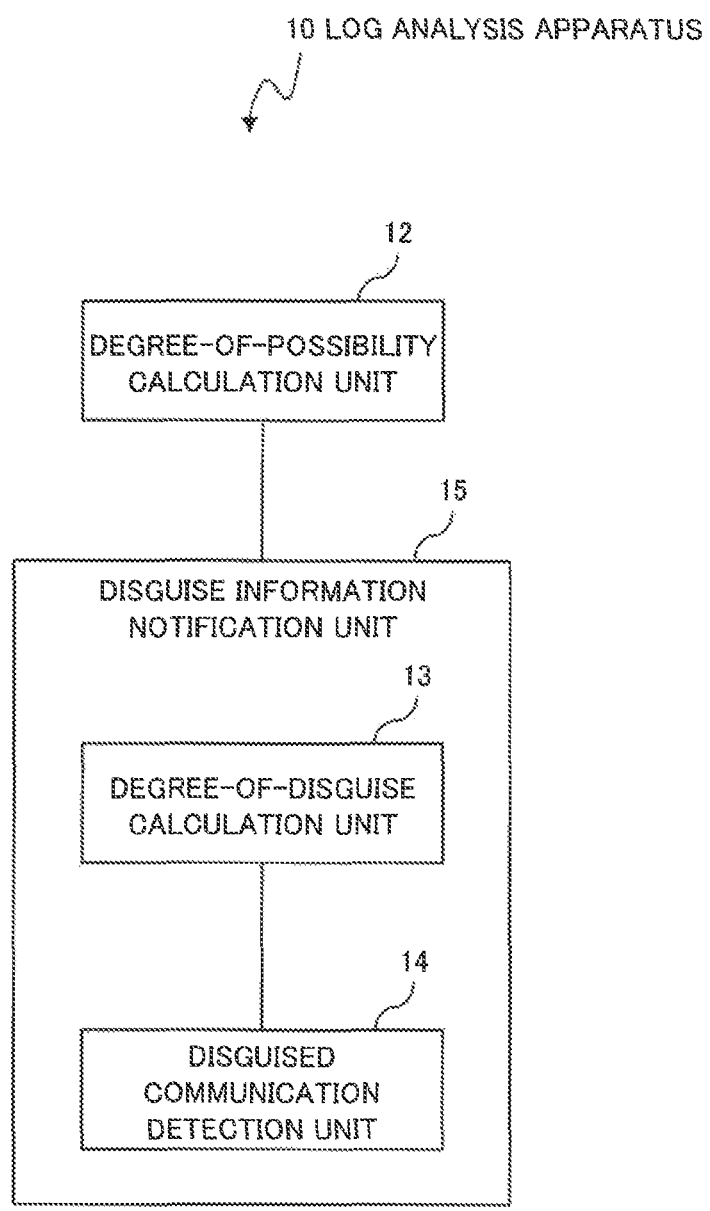
FIG. 1 is a block diagram showing a construction of a log analysis apparatus according to a first example embodiment of the present invention.

Example embodiments of the present invention will be described in detail with reference to the accompanying drawings. With regard to the example embodiments in the drawings and the description, like construction elements are given like signs and descriptions thereof are omitted as appropriate.

First Example Embodiment

FIG. 1 is a block diagram showing a construction of a log analysis apparatus (also termed information processing device) 10 according to a first example embodiment of the present invention. As shown in FIG. 1, the log analysis apparatus 10 according to the present Example embodiment includes a degree-of-possibility calculation unit 12 and a disguise information notification unit 15.

Figure 2:
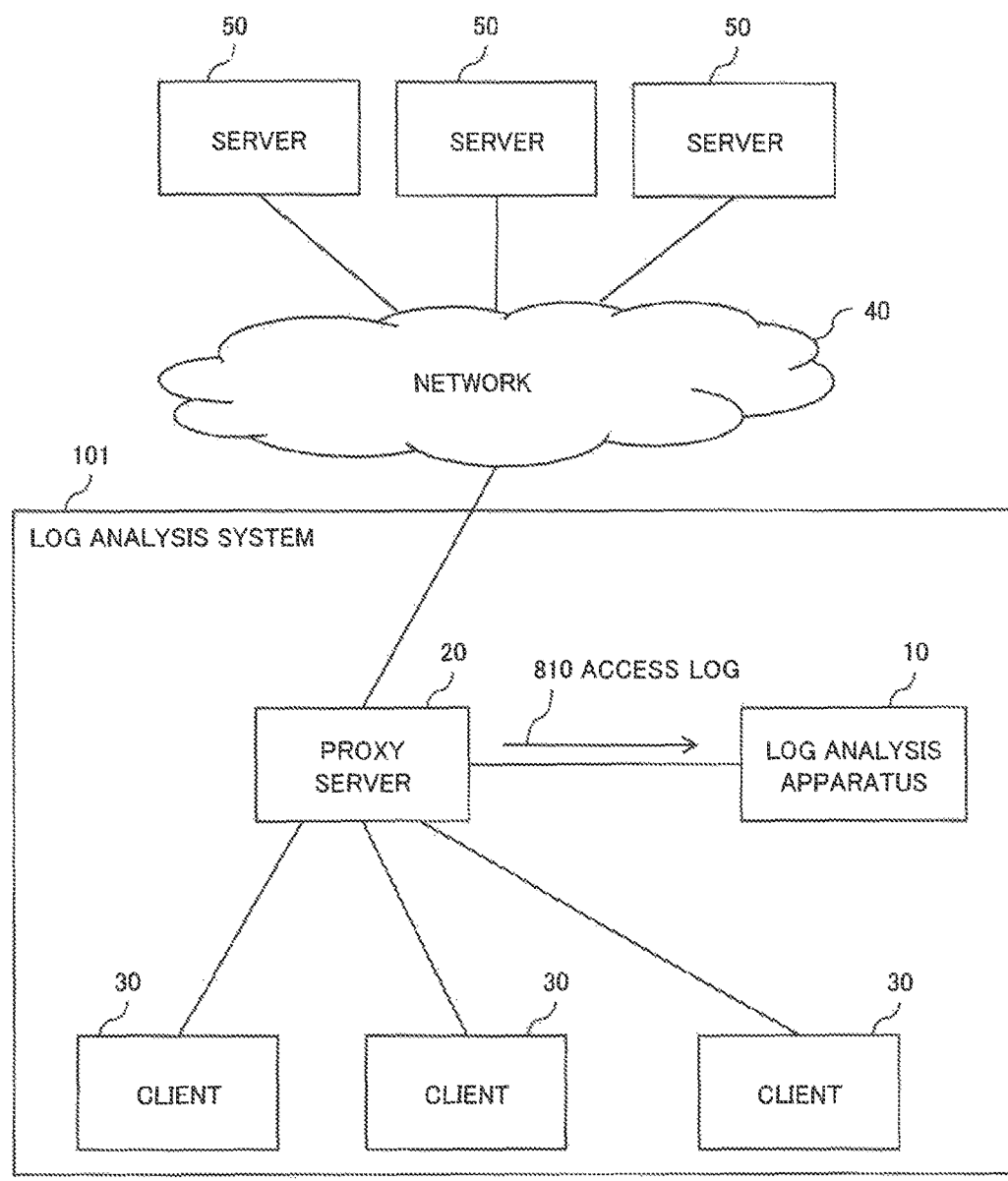
FIG. 2 is a block diagram showing a construction of a log analysis system that includes the log analysis apparatus according to the first example embodiment.

FIG. 2 is a block diagram showing a construction of a log analysis system (also termed information processing system) 101 that includes the log analysis apparatus 10. As shown in FIG. 2, the log analysis system 101 includes the log analysis apparatus 10, a proxy server 20, and a client 30. Furthermore, the proxy server 20 connects to a server 50 via a network 40.

Note that, regardless of the example shown in FIG. 2, the numbers of proxy servers 20 and clients 30 may be arbitrary. The network 40 may be the Internet or may be a specific limited network. The server 50 is, for example, a HTTP (Hypertext Transfer Protocol) server and the like.

===Log Analysis Apparatus 10===

The log analysis apparatus 10 analyzes an access log (also termed communication history) 810 generated by the proxy server 20 and detects communication performed by a fake user agent impersonating a practical user agent. The practical user agent and the fake user agent are collectively termed communication control means as well.

Note that the "practical user agent" herein indicates a user agent that is permitted to operate as a portion of the client 30. The practical user agent is, for example, an HTTP user agent of a web browser that is permitted to operate on the client 30. Furthermore, the practical user agent may also be another type user agent that is permitted to operate on the client 30 and sends a user agent character string at the time of communication.

The "fake user agent" indicates unauthorized software that disguises itself as a practical user agent and that executes communication. For example, the fake user agent is a portion of malware or the like.

The access log 810 is a history of communication between the client 30 and the server 50 which is relayed by the proxy server 20. In other words, the access log 810 is an access log of the access which is executed by the client 30 via the proxy server 20 to the server 50. Concretely, the access log 810 is a history of communication in which the practical user agent and the fake user agent that operate on the client 30 respectively access the server 50 connected to the network 40 via the proxy server 20.

Figure 3:
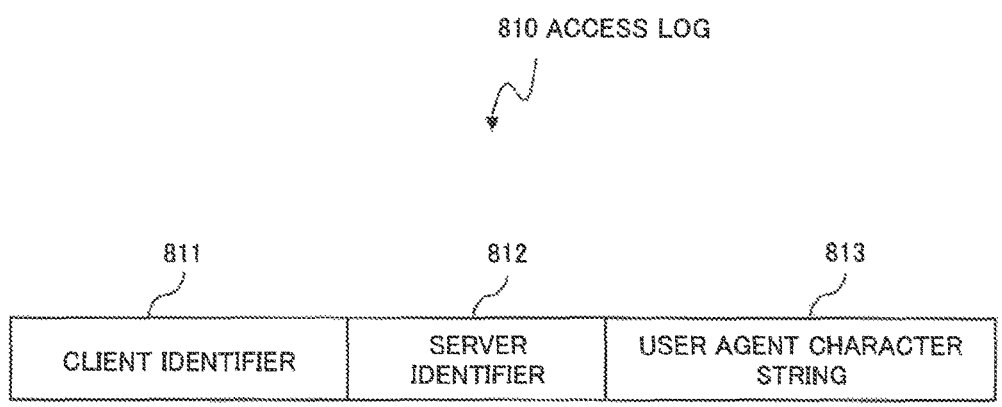
FIG. 3 is a diagram showing an example of a structure of an access log in the first example embodiment.

FIG. 3 is a diagram showing an example of a structure of the access log 810. As shown in FIG. 3, the access log 810 includes at least a client identifier 811, a server identifier 812, and a user agent character string 813.

The client identifier 811 is, for example, the IP (Internet Protocol) address of the client 30 that is an access source. The client identifier 811 is not limited to the IP address but may also be arbitrary information capable of identifying the client 30.

The server identifier 812 is, for example, a domain name. The server identifier 812 is not limited to the domain name but may be arbitrary information capable of identifying the server 50.

The user agent character string 813 is a character string for identifying a practical user agent which is included in a request that the client 30 of an access source sends out.

The log analysis apparatus 10 stores, for example, the access log 810 in storage means that is not graphically shown within the log analysis apparatus 10. Alternatively, the log analysis apparatus 10 may read the access log 810 from external storage means that is not graphically shown, according to need.

===Proxy Server 20===

The proxy server 20 at least has a function of accepting a request from the client 30 and relaying the request to the server 50 that is designated by the request. The request is, for example, a request for communication (e.g., HTTP communication) between the client 30 and the server 50. The request is not limited to the request for HTTP communication but may be any request.

The proxy server 20 outputs the access log 810 that is information regarding, for example, the request to the log analysis apparatus 10. Furthermore, the proxy server 20 may output the access log 810 to the storage means that is not graphically shown. The proxy server 20 outputs the access log 810 every time the proxy server 20 relays HTTP communication. Alternatively, the proxy server 20 may gather the access logs 810 and outputs the gathered access logs 810 to the log analysis apparatus 10 at a predetermined time, a timing requested from the log analysis apparatus 10, or the like.

===Client 30===

The client 30 performs communication with the server 50 connected to the network 40, via the proxy server 20. In other words, the client 30 accesses the servers 50 connected to the network 40, via the proxy server 20.

Next, each element included in the log analysis apparatus 10 according to the first example embodiment will be described. The each element shown in FIG. 1 may be a circuit of hardware unit or an element divided in function unit of the computer apparatus. The elements shown in FIG. 1 are assumed as elements divided in function units of the computer apparatus.

===Degree-of-Possibility Calculation Unit 12===

The degree-of-possibility calculation unit 12 calculates a degree of possibility with respect to each of the communication control means relating to the user agent character string 813 based on the access log 810. The degree of possibility indicates a degree of certainty of the communication control means being a practical user agent that is permitted to operate as a portion of the client 30. In other words, the degree of possibility is, for example, an index that indicates a possibility that the communication control means that has executed communication of accessing the server 50 that is a web server is a practical user agent of a web browser that is permitted to operate on the client 30.

Concretely, the degree-of-possibility calculation unit 12 analyzes the access logs 810 and calculates the degrees of possibility relating to each of the user agent character strings 813. That is, the degree of possibility relating to the user agent character string 813 is the degree of possibility relating to either one of a practical user agent and a fake user agent (i.e., communication control means).

For example, the degree-of-possibility calculation unit 12 calculates the degrees of possibility relating to each of the user agent character strings 813 separately for each client 30. In that case, the degree of possibility is a value calculated for a pair of the client 30 and the user agent character string 813, that is, a pair of the client 30 and the communication control means. The degree-of-possibility calculation unit 12 may calculate the degree of possibility relating to each of user agent character strings 813 separately for each of groups of the clients 30 grouped based on an arbitrary criterion. Alternatively, the degree-of-possibility calculation unit 12 may calculate the degree of possibility for each of the user agent character strings 813 by gathering all of the clients 30.

Detailed description of calculation of the degree of possibility will be given later.

===Disguise Information Notification Unit 15===

The disguise information notification unit 15 outputs disguise information based on the degrees of possibility calculated by the degree-of-possibility calculation unit 12. The disguise information is information regarding the communication (access to the servers 50) performed by a fake user agent impersonating a practical user agent.

As shown in FIG. 1, the disguise information notification unit 15 includes a degree-of-disguise calculation unit 13 and a disguised communication detection unit 14, for example.

The degree-of-disguise calculation unit 13 calculates a degree of disguise relating to each of the servers 50 based on the degree of possibility calculated by the degree-of-possibility calculation unit 12. The degree of disguise indicates a degree of certainty of the communication being communication executed by a fake user agent. In other words, the degree of disguise is an index indicating whether or not the communication control means on the client 30 accessing a certain server 50 is a fake user agent impersonating a practical user agent. Detailed description of a calculation method for the degree of disguise will be given later.

The disguised communication detection unit 14, for example, detects a server 50 whose degree of disguise calculated by the degree-of-disguise calculation unit 13 is greater than or equal to a threshold value, and outputs disguise information that includes the server identifier 812 of the detected server 50. The threshold value is, for example, empirically or theoretically calculated and given to the log analysis apparatus 10 beforehand.

Furthermore, the disguised communication detection unit 14 may output disguise information that includes arbitrary information such as the client identifier 811, the user agent character string 813, and the access log 810 that are related to the degree of disguise that is greater than or equal to the threshold value.

The above is description of the elements of function units of the log analysis apparatus 10.

Next, elements of hardware units of the log analysis apparatus 10 will be described.

Figure 4:
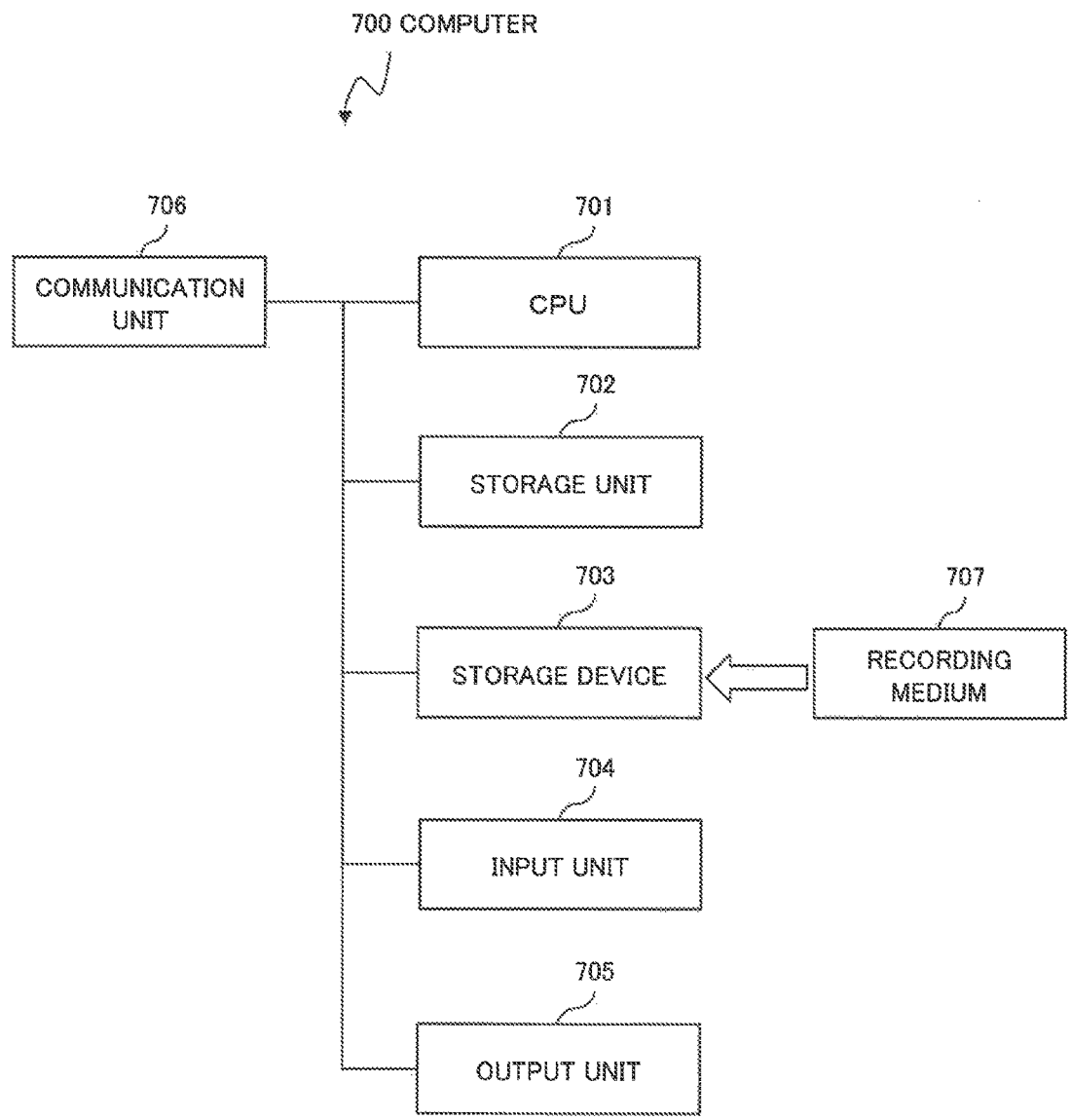
FIG. 4 is a block diagram showing a hardware construction of a computer that realizes the log analysis apparatus according to the first example embodiment.

FIG. 4 is a diagram showing a hardware construction of a computer 700 that realizes the log analysis apparatus 10 in the present example embodiment.

As shown in FIG. 4, the computer 700 includes a CPU (Central Processing Unit) 701, a storage unit 702, a storage device 703, an input unit 704, an output unit 705, and a communication unit 706. Furthermore, the computer 700 includes a recording medium (or a storage medium) 707 that is supplied from outside. For example, the recording medium 707 is a non-transitory recording medium (non-temporary recording medium) which non-temporarily stores information thereon. Alternatively, the recording medium 707 may also be a temporary recording medium that holds information as signals.

The CPU 701 controls overall operations of the computer 700 by operating an operating system (not graphically shown). For example, the CPU 701 reads a program and data from the recording medium 707 mounted to the storage device 703, and writes the read program and data into the storage unit 702. The program is a program for causing the computer 700 to execute an operation of a flowchart shown in FIG. 5 described below, for example.

Then, the CPU 701, following the read program or based on the read data, executes each of processes as the degree-of-possibility calculation unit 12 and the disguise information notification unit 15 shown in FIG. 1.

The CPU 701 may download the program or the data to the storage unit 702 from an external computer (not graphically shown) connected to a communication network (not graphically shown).

The storage unit 702 stores the program or the data. The storage unit 702 may store the access log 810, an access log 880 described later, information shown in FIG. 6, information shown in FIG. 7, or the like.

The storage device 703 is, for example, an optical disk, a flexible disk, a magneto-optical disk, an external hard disk, a semiconductor memory, or the like, and includes the recording medium 707. The storage device 703 (recording medium 707) stores the program in a computer-readable manner. Furthermore, the storage device 703 may store the data. The storage device 703 may store the access log 810, the access log 880 described below, the information shown in FIG. 6, the information shown in FIG. 7, or the like.

The input unit 704 accepts input of an operation by an operator and input of information from outside. A device used for an input operation is, for example, a mouse, a keyboard, a built-in key button, a touch panel, or the like.

The output unit 705 is realized by, for example, a display. The output unit 705 is used, for example, for an input request to an operator by a GUI (Graphical User Interface), output presentation to an operator, or the like.

The communication unit 706 realizes an interface with the proxy server 20. The communication unit 706 is, for example, included as a portion of the degree-of-possibility calculation unit 12.

As described above, the blocks of function units of the log analysis apparatus 10 shown in FIG. 1 are realized by the computer 700 that has a hardware construction shown in FIG. 4. However, the means for realizing each portion which the computer 700 is quipped is not limited to above. That is, the computer 700 may be realized by one apparatus that is physically united or may also be realized by two or more physically separate apparatuses by connecting these apparatuses by wire or wirelessly.

When the recording medium 707 recording the codes of the foregoing program is supplied to the computer 700, the CPU 701 may read and execute the codes of the program stored on the recording medium 707. Alternatively, the CPU 701 may store the codes of the program stored on the recording medium 707 into the storage unit 702, the storage device 703, or both. That is, the present example embodiment includes an example embodiment of the recording medium 707 that temporarily or non-temporarily stores the program (software) that the computer 700 (CPU 701) executes. A storage medium that non-temporarily stores information is also termed non-transitory storage medium.

The above is description of each of the elements of hardware units of the computer 700 that realizes the log analysis apparatus 10 in the present example embodiment.

Next, operations of the present example embodiment will be described in detail with reference to the accompanying drawings.

Figures 5, 6:
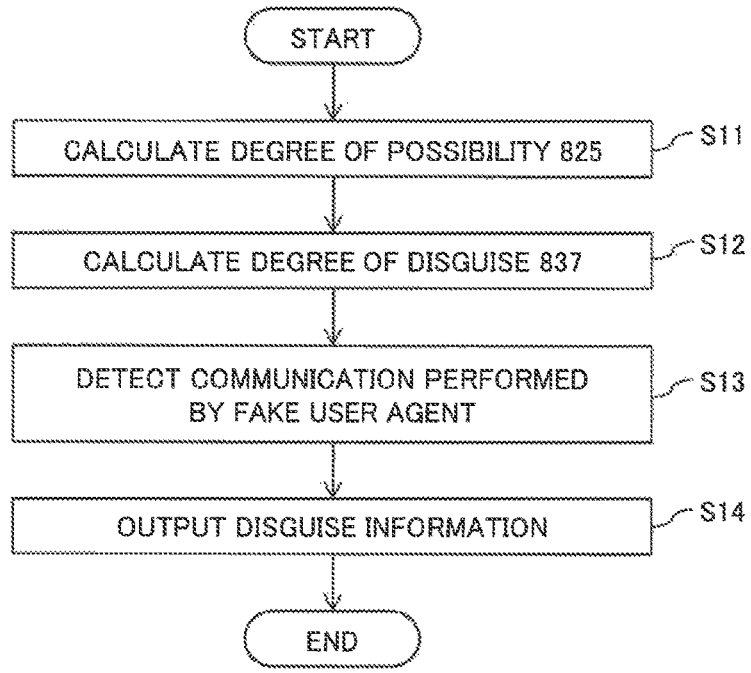
FIG. 5 is a flowchart showing an operation of the log analysis apparatus in the first example embodiment.
FIG. 6 is a diagram showing an example of the degree of possibility in the first example embodiment.

FIG. 5 is a flow chart showing an operation of the log analysis apparatus 10 in the present example embodiment. A process by this flowchart may be executed based on the program control by the CPU 701 described above. Furthermore, the names of steps of the process are expressed in symbols such as S11.

The log analysis apparatus 10 executes the analysis process of the access log 810 (communication history) with respect to the access log 810 kept during a certain period (e.g., of one day) in a batch manner. Herein after, description will be made on the assumption that the storage unit 702 that is a portion of the degree-of-possibility calculation unit 12 stores the access log 810 of one day.

The log analysis apparatus 10 executes the process of the flowchart shown in FIG. 5, for example, at every predetermined time (e.g., 0 hour a.m.). Alternatively, the log analysis apparatus 10 may execute the process of the flowchart shown in FIG. 5, for example, when receiving an instruction from the operator via the input unit 704.

The degree-of-possibility calculation unit 12 calculates the degree of possibility (step S11).

FIG. 6 is a diagram showing an example of the degree of possibility 825 calculated. The degree-of-possibility calculation unit 12 calculates the degrees of possibility 825, for example, by the following procedure.

Firstly, the degree-of-possibility calculation unit 12, based on the access log 810, tallies the numbers of domains 824 of access destinations separately for each pair of the client identifier 811 and the user agent character string 813. Namely, the pair of the client identifier 811 and the user agent character string 813 indicates a pair of the client 30 and the communication control means (the practical user agent or the fake user agent). Furthermore, the number of domains 824 is the number of the server identifiers 812 of the access destination.

Secondly, based on the numbers of domains 824, the degree-of-possibility calculation unit 12 calculates the degree of possibility 825 relating to the pair of the client identifier 811 and the user agent character string 813.

For example, the degree-of-possibility calculation unit 12 calculates the degree of possibility 825 as "1" when the number of the domains 824 exceeds a threshold value (e.g., "10"), and calculates the degree of possibility 825 as "0" when the number of the domains 824 is less than or equal to the threshold value. That threshold value is a threshold value that is empirically or theoretically predetermined.

Alternatively, the degree-of-possibility calculation unit 12 may utilize a function in which the larger the value of an independent variable, the closer to "1" the value of a dependent variable becomes and in which the smaller the value of the independent variable, the closer to "0" the value of the dependent variable becomes, and calculate the degree of possibility 825 relating to the dependent variable by setting the number of domains 824 as the independent variable. Such a function is, for example, a sigmoid function, a Gompertz function, and the like.

The degree-of-possibility calculation unit 12 may exclude from the objects to be processed (analysis objects) the access log 810 that includes the user agent character string 813 associated with the practical user agent of which the origin is obvious, that is, which is certainly not an impersonating agent to be detected. Furthermore, the degree-of-possibility calculation unit 12 may exclude from the objects to be processed (analysis objects) the access log 810 that includes a pair of the server identifier 812 and the user agent character string 813 of which the origin is obvious.

For example, the user agent character strings 813 of web browsers are mostly character strings that begin with "Mozilla/". Therefore, from the viewpoint of detection of a fake user agent impersonating a practical user agent of a web browser, it is efficient to regard only what contain the foregoing user agent character strings 813 as analysis objects.

On the other hand, by regarding all the access logs 810 as analysis objects, it possible to detect a fake user agent in various accesses that are not related to the browser operations by users.

Referring back to FIG. 5, next, the degree-of-disguise calculation unit 13 of the disguise information notification unit 15 calculates the degree of disguise based on the degree of possibility 825 (step S12). The degree-of-disguise calculation unit 13 calculates the degree of disguise for each server 50, for example.

FIG. 7 is a diagram showing an example of the calculated degree of disguise 837. FIG. 7 shows that there are accesses from four pairs of <client, communication control means> 836 to a server identifier 812 named "malicious.example.com", and shows the degree of possibility 825 relating to each of those pairs. In the <client, communication control means> 836, the "client" is the client identifier 811 and the "communication control means" is the user agent character string 813.

Furthermore, FIG. 7 shows the degree of disguise 837 relating to the server identifier 812. In other words, FIG. 7 shows the degree of disguise 837 relating to communication between the server 50 identified by the server identifier 812 and the communication control means that operates on the client 30 identified by the <client, communication control means> 836.

The degree-of-disguise calculation unit 13, in the example shown in FIG. 7, calculates a value "0.75" obtained by subtracting an average value "0.25" of the degrees of possibility 825 from "1" as the degree of disguise 837. Regardless of the foregoing example, the degree-of-disguise calculation unit 13 may calculate the degree of disguise 837 by an arbitrary appropriate technique.

Referring back to FIG. 5, next, the disguised communication detection unit 14 of the disguise information notification unit 15 detects communication performed by a fake user agent, based on the degree of disguise 837 (step S13).

For example, when the degree of disguise 837 calculated by the degree-of-disguise calculation unit 13 exceeds a predetermined threshold value, the disguised communication detection unit 14 determines that the communication to the domain of the server identifier 812 is communication performed by a fake user agent.

Next, the disguised communication detection unit 14 outputs disguise information regarding the communication performed by a fake user agent (step S14). The disguise information includes, for example, the server identifier 812.

For example, the disguised communication detection unit 14 notifies the disguise information, via the output unit 705 shown in FIG. 4, to an operator that manages the log analysis system 101. Alternatively, the disguised communication detection unit 14 may notify the disguise information to the proxy server 20. In this case, the proxy server 20 may register the server identifier 812 contained in the notified disguise information on the black list and may cut off, from then on, the communication to the server 50 relating to the server identifier 812. By the foregoing construction, it is possible to take a temporary measure before the operator's final judgement is obtained.

The log analysis apparatus 10 of the present example embodiment detects communication performed by a fake user agent more effectively if it becomes more difficult to fake the user agent character string 813 of a principal browser. For example, in Internet Explorer (registered trademark), which is high in usage share, information about installed plug-ins, installed toolbars, and the like is added to the user agent character string. Therefore, it is difficult for a fake user agent to generate the user agent character string so as to perfectly match the user agent character string of Internet Explorer. However, it is not impossible for a fake user agent that is malware to perform the eavesdropping of communication of the client 30, reference to a specific entry of registry information, or the like and utilize the thus-obtained information so as to carry out complete impersonation. However, such behavior of malware (fake user agent) is detected as a malware activity by a behavioral detection technique implemented in antivirus software. The log analysis apparatus 10 of the present example embodiment can be said to be what performs a complementary role for such the technique of antivirus software.

A first advantageous effect of the foregoing present example embodiment is that, regardless of use environment, it becomes possible to obtain information regarding communication performed by malware impersonating a practical user agent.

A reason for this is because the degree-of-possibility calculation unit 12 calculates the degree of possibility 825 and the disguise information notification unit 15 outputs disguise information based on the degree of possibility 825.

Concretely, the log analysis apparatus 10 performs the calculation of the degree of disguise 837 of communication to the certain server 50 based on the degrees of possibility 825 on a plurality of the clients 30 that communicate with the server 50 via the proxy server 20. Then, based on that degree of disguise 837, the log analysis apparatus 10 can detect access performed by what is other than the principal practical user agent. The principal practical user agent is, for example, a practical user agent of a web browser mainly used on the client 30. As the result, the log analysis apparatus 10 can detect communication performed by a fake user agent impersonating a practical user agent of a web browser.

A second advantageous effect of the foregoing present example embodiment is that it becomes possible to prevent false detection in detection of communication performed by malware impersonating a practical user agent.

A reason for this is because the disguise information notification unit 15 calculates the degree of disguise 837 relating to the server identifier 812 by tallying the degrees of possibility 825 relating to a plurality of clients 30 respectively.

For example, the log analysis apparatus 10 can inhibit the server 50, that many clients 30 access by using principal browsers, from being falsely detected as the server 50 that is an object with which a fake user agent communicates. This is because the practical user agents of the principal browsers are relatively calculated high degrees of possibility calculated on relatively many clients 30.

Modification of First Example Embodiment

The degree-of-possibility calculation unit 12 performs calculation of the degree of possibility 825 by combining the user agent character string 813 with other header information such as an "Accept" header, an "Accept-Language" header, or the like.

By doing it this way, the log analysis apparatus 10 detects communication performed by a fake user agent even when the user agent character string 813 faked by a fake user agent matches the user agent character string 813 of a practical user agent.

Second Example Embodiment

Next, a second example embodiment of the present invention will be described in detail with reference to the accompanying drawings. Hereinafter, description of contents redundant relative to the foregoing description will be omitted provided that description of the present example embodiment does not become unclear.

Figure 8:
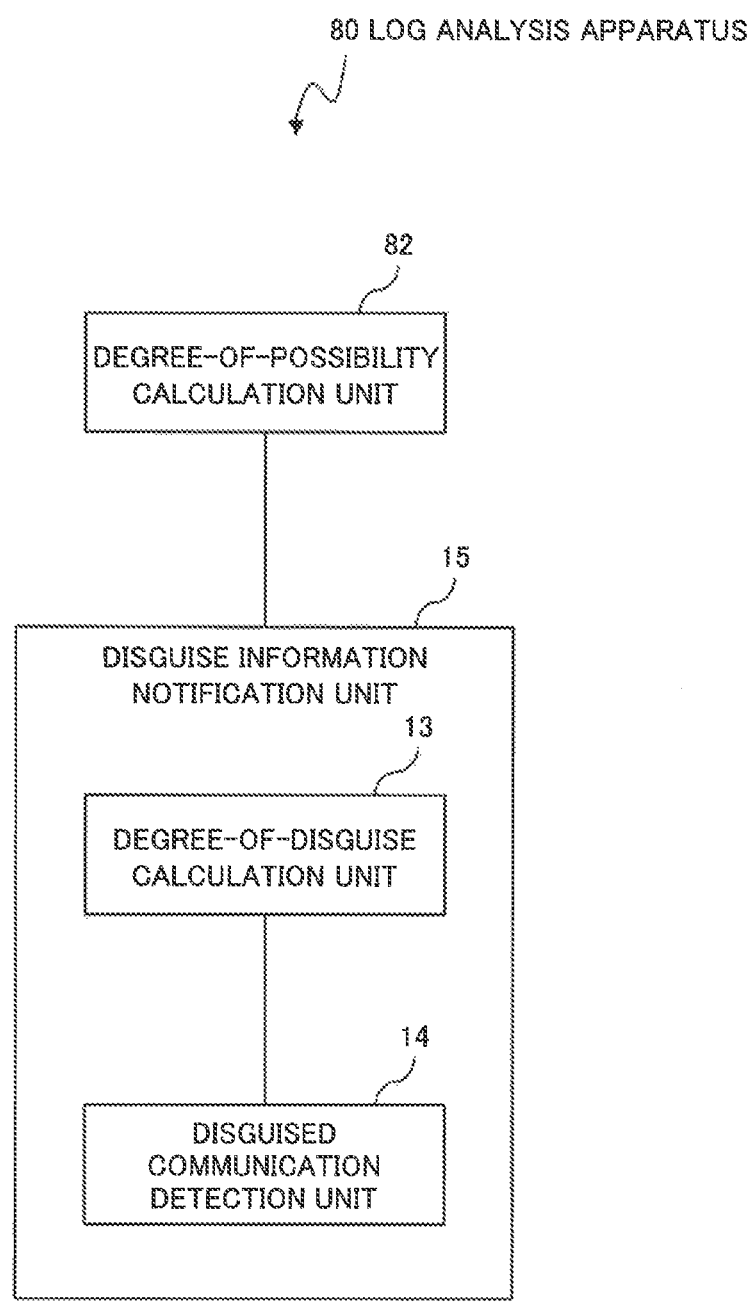
FIG. 8 is a block diagram showing a construction of a log analysis apparatus according to a second example embodiment of the present invention.

FIG. 8 is a block diagram showing a construction of a log analysis apparatus 80 according to the second example embodiment of the present invention. As shown in FIG. 8, the log analysis apparatus 80 in the present example embodiment is different from the log analysis apparatus 10 of the first example embodiment in that the log analysis apparatus 80 includes a degree-of-possibility calculation unit 82 in place of the degree-of-possibility calculation unit 12.

Figure 9:
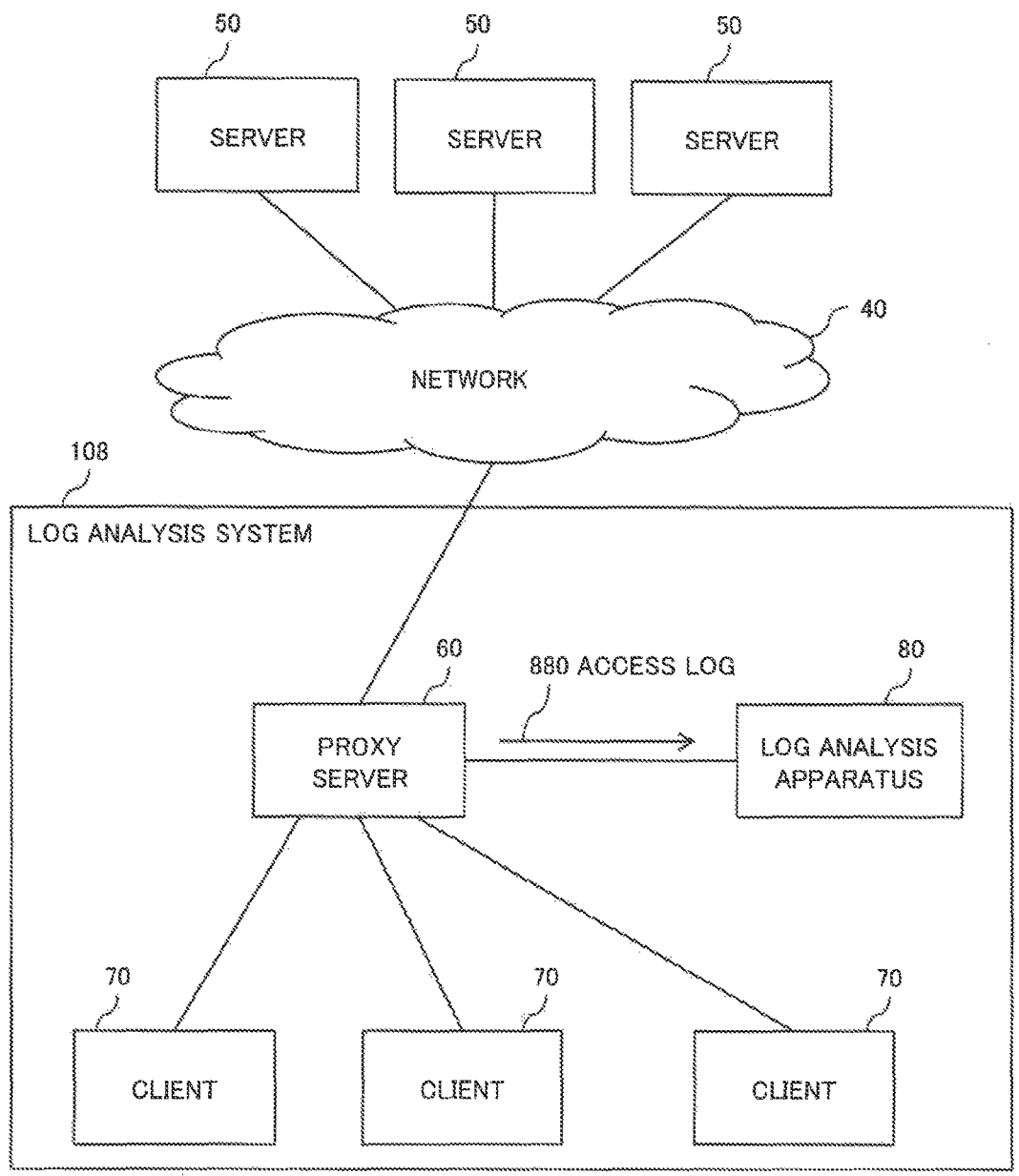
FIG. 9 is a block diagram showing a construction of a log analysis system that includes the log analysis apparatus according to the second example embodiment.

FIG. 9 is a block diagram showing a construction of a log analysis system 108 that includes the log analysis apparatus 80. As shown in FIG. 9, the log analysis system 108 includes the log analysis apparatus 80, a proxy server 60, and a client 70. Furthermore, the proxy server 60 connects to the server 50 via the network 40.

Regardless of the example shown in FIG. 9, the numbers of the proxy servers 60 and the client 70 may be arbitrary.

===Client 70===

The client 70, when sending a request to the proxy server 60, adds to a request header included in the request an agent tag for indicating an access from a practical user agent.

It is preferable that the agent tag is a character string that is difficult to be faked. Concretely, it is preferable that the agent tag is different for each of the client 70 and difficult to guess from the network 40 side.

The client 70, for example, embeds the agent tag in the user agent character string contained in the request headers. The client 70 may embeds the agent tag in information in the request headers which is other than the user agent character string.

===Proxy Server 60===

The proxy server 60 outputs the access log that is information regarding the request to, for example, the log analysis apparatus 80. Furthermore, the proxy server 60 may output the access log to storage means that is not graphically shown.

The access log in the case where the agent tag is embedded in the user agent character string is the access log 810 that has the structure shown in FIG. 3.

Figure 10:
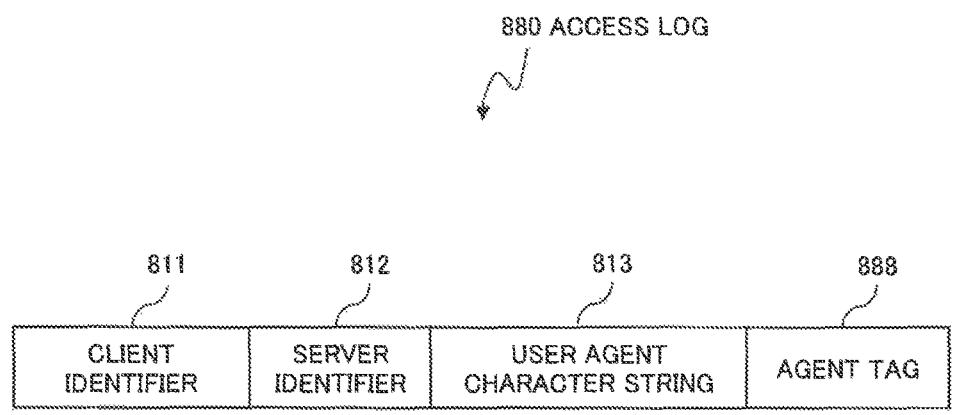
FIG. 10 is a diagram showing an example of a structure of an access log in the second example embodiment.

FIG. 10 is a diagram showing an example of a structure of an access log 880 in the case where the agent tag is embedded in information in the request header which is other than the user agent character string. As show in FIG. 10, the access log 880 includes at least the client identifier 811, the server identifier 812, the user agent character string 813, and an agent tag 888.

Furthermore, the proxy server 60, when receiving a request from the client 70 and relaying the request to the server 50, may delete the agent tag contained in the request.

===Degree-of-Possibility Calculation Unit 82===

The degree-of-possibility calculation unit 82, based on the access logs 810, calculates the degrees of possibility 825 for each of the communication control means relating to the user agent character string 813. The degree of possibility 825, as stated above, indicates the degree of certainty of communication control means being a practical user agent that is permitted to operate as a portion of the client 70. In this case, the degree-of-possibility calculation unit 82 calculates the degrees of possibility 825 for each of the communication control means relating to the user agent character string 813 that contains the agent tag.

Furthermore, the degree-of-possibility calculation unit 82, based on the access logs 880, calculates the degrees of possibility 825 for each of the communication control means relating to the user agent character string 813. In this case, the degree-of-possibility calculation unit 82 calculates the degrees of possibility 825 for each of the communication control means relating to a pair of the user agent character string 813 that does not contain the agent tag and the agent tag 888.

The log analysis apparatus 80 of the present example embodiment may be constructed of the computer 700 shown in FIG. 4. In this case, the CPU 701 executes each of processes as the degree-of-possibility calculation unit 82 and the disguise information notification unit 15 shown in FIG. 8, by according to the read program or based on the read data.

Next, operations of the present example embodiment will be described in detail with reference to the accompanying drawings.

Figure 11:
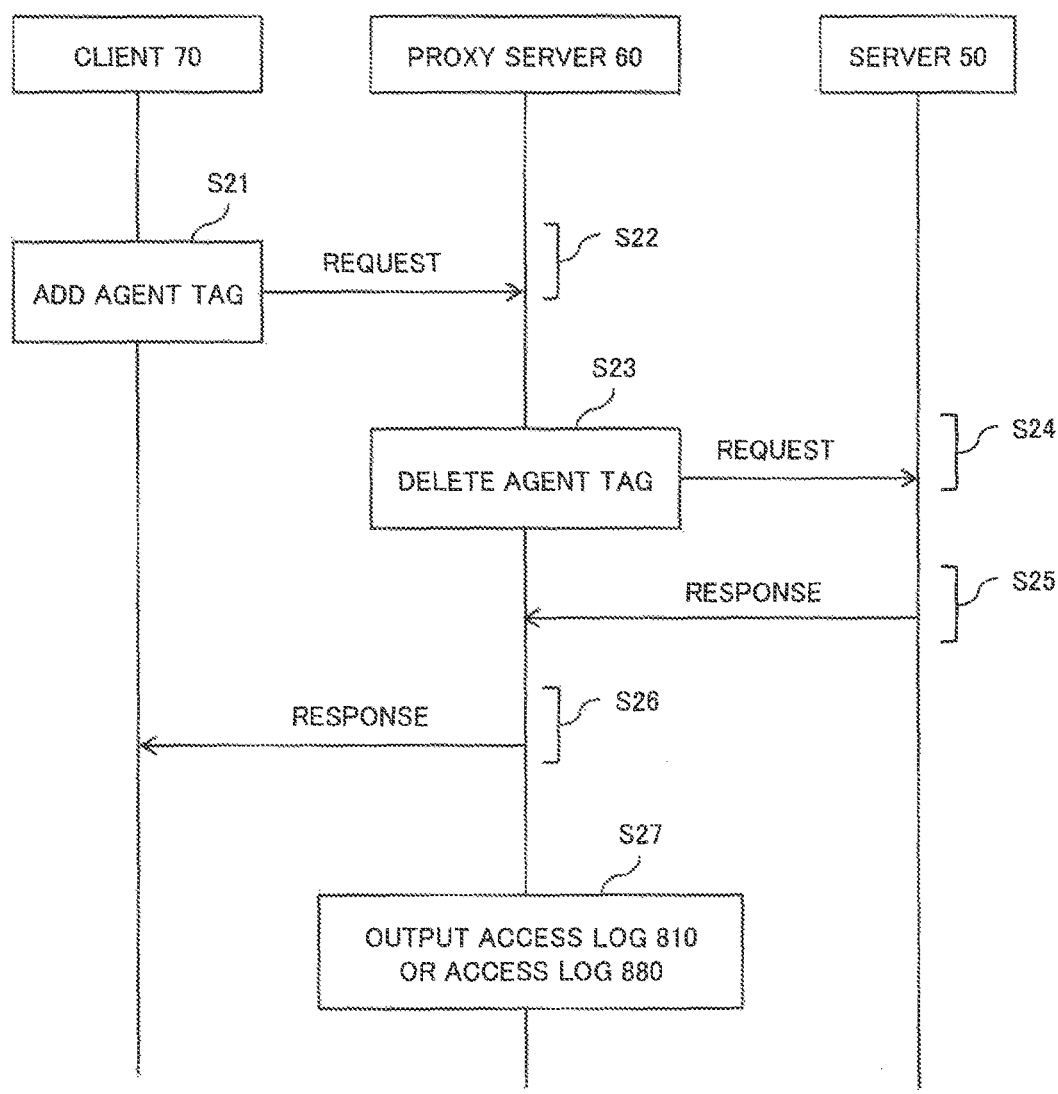
FIG. 11 is a flowchart showing an operation of the log analysis system in the second example embodiment.

FIG. 11 is a sequence chart showing operations of the log analysis system 108 when generating the access log 810 and the access log 880 in the present example embodiment.

A client 70 adds the agent tag to the request to the server 50 (step S21).

Next, the client 70 sends the request to the proxy server 60 (step S22).

Next, the proxy server 60, which receives the request from the client 70, deletes the agent tag (step S23). At this time, the proxy server 60 records the request which has not deleted the agent tag in, for example, the storage unit 702 shown in FIG. 4.

Next, the proxy server 60 relays the request deleted the agent tag to the server 50 (step S24).

Next, the proxy server 60 receives a response sent from the server 50 (step S25).

Next, the proxy server 60 relays the response to the client 70 (step S26).

Next, the proxy server 60 outputs the access log 810 or the access log 880 based on the request information before the agent tag is deleted (step S27).

The operations of the log analysis apparatus 80 are same as the operations of the flowchart shown in FIG. 5.

A first advantageous effect of the present example embodiment described above is that it becomes possible to improve the accuracy of detection of communication performed by malware impersonating a browser in addition to the advantageous effects of the first example embodiment.

A reason for that is because the client 70 adds the agent tag to the request header and the log analysis apparatus 80 calculates the degrees of possibility 825 based on the agent tags as well.

For example, among web browsers, there is a web browser in which information about plug-ins and the like is not reflected in the user agent character string. Therefore, in such a web browser, even when malware utilizes such a fixed user agent header, there is possibility that the user agent character string may possibly match and a disguise may be left undetected. The log analysis system 108 of the present example embodiment has an advantageous effect of preventing the match with a fixed user agent character string by adding the agent tag.

A second advantageous effect of the present example embodiment described above is that it becomes possible to prevent the agent tag from being sent out to the network 40 and make it more difficult to guess the agent tag on the network 40 side.

A reason for that is because the proxy server 60 deletes the agent tag from the request and transfers the request with the agent tag deleted.

The each elements of the foregoing example embodiments does not need to be present individually independently. For example, a plurality of arbitrary elements may be realized as one module. Alternatively, an arbitrary one of the elements may be realized by a plurality of modules. Alternatively, an arbitrary one of the elements may be another arbitrary one of the elements. Alternatively, an arbitrary portion of the elements and another arbitrary portion of the elements may be duplicate.

The each element and the module realizing the each element in the foregoing example embodiments may be realized, if possible, with a hardware fashion, according to need. Alternatively, the each element and the module realizing the each element may be realized with a computer and a program. Alternatively, the each element and the module realizing the each element may be realized by a mixture of a hardware fashioned module with a computer and a program.

The program is, for example, recorded on a computer readable non-transitory recording medium, such as a magnetic disk, a semiconductor memory, or the like, and supplied to the computer. Then, the program is read from the non-transitory recording medium to the computer at the time of starting up the computer or the like. The read program causes the computer to function as the elements in the example embodiments described above by controlling the operations of the computer.

Furthermore, each of the foregoing example embodiments is not limited by the execution of a plurality of operations at individually different timings. For example, while a certain operation is being executed, another operation may occur. Furthermore, the execution timings of a certain operation and another operation may partially or entirely coincide with each other.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-106226, filed on May 22, 2014, the disclosure of which is incorporated herein in its entirety by reference.

REFERENCE SINGS LIST

10 Log analysis apparatus
12 Degree-of-possibility calculation unit
13 Degree-of-disguise calculation unit
14 Disguised communication detection unit
15 Disguise information notification unit
20 Proxy server
30 Client
40 Network
50 Server
60 Proxy server
70 Client
80 Log analysis apparatus
82 Degree-of-possibility calculation unit
101 Log analysis system
108 Log analysis system
700 Computer
701 CPU
702 Storage unit
703 Storage device
704 Input unit
705 Output unit
706 Communication unit
707 Recording medium
810 Access log
811 Client identifier
812 Server identifier
813 User agent character string
824 Number of domains
825 Degree of possibility
836 <Client, communication control means>
837 Degree of disguise
880 Access log
888 Agent tag

The invention claimed is:

1. An information processing device comprising a processor configured to:

calculate a degree of possibility that indicates a degree of certainty of a practical user agent permitted to operate as a portion of a client, with respect to each user agent that relates to a user agent character string, based on a history of communication between the client and a server, the history including at least an identifier of the server, an identifier of the client, and the user agent character string included in a request header that is sent from the client and includes information about at least one of a browser, a plug-in installed in the browser, and a toolbar installed in the browser; and output, based on the degree of possibility, disguise information that is information regarding communication performed by a fake user agent impersonating the practical user agent, wherein the processor is further configured to exclude the user agent character string when it includes a specific string.

2. The information processing device according to claim 1, wherein the processor is further configured to:

calculate a degree of disguise that relates to each server and indicates a degree of certainty of the communication being the communication executed by the fake user agent based on the degree of possibility; and detect the server for which the degree of disguise is greater than or equal to a threshold value and outputs the disguise information that includes the identifier of the detected server.

3. The information processing device according to claim 2, wherein the processor is further configured to calculate separately for each server, the degree of disguise that is relatively greater as the degree of possibility that relates to the server is smaller.

4. The information processing device according to claim 1, wherein the processor is further configured to calculate the degree of possibility that relates to each pair of the client and the user agent based on the user agent character string, the identifier of the client, and the identifier of the server.

5. The information processing device according to claim 1, wherein the history of communication further includes an agent tag that is added by the client and indicates an access from the practical user agent, and the processor is further configured to calculate the degree of possibility based on the agent tag as well.

6. The information processing device according to claim 1, wherein the processor is further configured to use client and communication pair degrees of possibilities to calculate the degree of possibility.

7. The information processing device according to claim 1, wherein the processor is further configured to use the request header information for calculating the degree of possibility.

8. A communication history analysis method comprising:

calculating a degree of possibility that indicates a degree of certainty of a practical user agent permitted to operate as a portion of the client, with respect to each user agent that relates to a user agent character string, based on a history of communication between the client and a server, the history including at least an identifier of the server, an identifier of the client, and the user agent character string included in a request header that is sent from the client and includes information about at least one of a browser, a plug-in installed in the browser, and a toolbar installed in the browser; and outputting, based the degree of possibility, disguise information that is information regarding communication performed by a fake user agent impersonating the practical user agent, wherein the method further includes excluding the user agent character string when it includes a specific string.

9. A computer-readable non-transitory recording medium embodying a program, the program causing a computer to perform a method, the method comprising:

calculating a degree of possibility that indicates a degree of certainty of a practical user agent permitted to operate as a portion of the client, with respect to each user agent that relates to a user agent character string, based on a history of communication between the client and a server, the history including at least an identifier of the server, an identifier of the client, and the user agent character string included in a request header that is sent from the client and includes information about at least one of a browser, a plug-in installed in the browser, and a toolbar installed in the browser; and outputting, based on the degree of possibility, disguise information that is information regarding communication performed by a fake user agent impersonating the practical user agent, wherein the method further comprises excluding the user agent character string when it includes a specific string.

* * * * *